(12) United States Patent
Cheng et al.

(10) Patent No.: US 7,979,075 B2
(45) Date of Patent: Jul. 12, 2011

(54) GENERATION, DEPLOYMENT AND USE OF TAILORED CHANNEL QUALITY INDICATOR TABLES

(75) Inventors: Jung-Fu Cheng, Cary, NC (US); Stephen J. Grant, Cary, NC (US); Dennis Hui, Cary, NC (US); Karl James Molnar, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 567 days.

(21) Appl. No.: 11/555,294

(22) Filed: Nov. 1, 2006

(65) Prior Publication Data

US 2007/0259671 A1    Nov. 8, 2007

Related U.S. Application Data

(60) Provisional application No. 60/797,292, filed on May 3, 2006.

(51) Int. Cl.
  *H04W 72/00* (2009.01)
(52) U.S. Cl. ...................... 455/450; 455/451; 455/452.1; 455/452.2; 455/453; 455/464; 370/328
(58) Field of Classification Search .................. 455/450, 455/451, 452.1, 452.2, 453, 464, 509, 447, 455/135, 161.3, 423; 370/328
See application file for complete search history.

(56) References Cited

U.S. PATENT DOCUMENTS

| | | | |
|---|---|---|---|
| 6,215,827 B1 | 4/2001 | Balachandran et al. | |
| 2004/0057394 A1 | 3/2004 | Holtzman | |
| 2004/0064497 A1* | 4/2004 | Debey | 709/201 |
| 2004/0142698 A1 | 7/2004 | Pietraski | |
| 2004/0146023 A1* | 7/2004 | Pietraski et al. | 370/333 |
| 2004/0203475 A1 | 10/2004 | Gaal | |
| 2006/0018336 A1 | 1/2006 | Sutivong et al. | |
| 2006/0019608 A1* | 1/2006 | Furuumi et al. | 455/67.15 |
| 2006/0111100 A1 | 5/2006 | Murata et al. | |

FOREIGN PATENT DOCUMENTS

EP    1463230    9/2004
(Continued)

OTHER PUBLICATIONS

"Universal Mobile Telecommunications System (UMTS); Physical Layer Procedures (FDD) (3GPP Ts 25.214 version 7.0.0 Release 7)," Mar. 2006, pp. 1-60, XP-014034263.

*Primary Examiner* — Wayne Cai
(74) *Attorney, Agent, or Firm* — Coats & Bennett, PLLC (57) ABSTRACT

Channel Quality Indicator (CQI) tables are tailored to one or more cells of interest. Tailoring CQI tables to individual cells permits devices such as radio base stations to more reliably and accurately allocate radio resources to those cells since channel conditions vary from cell to cell. According to one embodiment, a table of CQI values is composed by analyzing information indicating channel quality in a cell of interest and generating at least one table of CQI values tailored to the cell of interest based on the information analyzed. The tailored CQI table may be deployed to another device for use in reporting channel quality information. The device may report channel quality by accessing the tailored CQI and identifying the range of CQI values that includes a channel quality estimate derived by the device. The device generates a channel quality information message based on the identified range of CQI values.

42 Claims, 9 Drawing Sheets

FOREIGN PATENT DOCUMENTS

| | | |
|---|---|---|
| EP | 1571762 | 9/2005 |
| EP | 1592143 | 11/2005 |
| EP | 1619923 | 1/2006 |
| EP | 1630995 | 3/2006 |
| GB | 2412553 | 9/2005 |
| JP | 2005-057710 | 3/2005 |
| WO | WO 2006/138622 | 12/2006 |
| WO | WO 2006138622 A2 * | 12/2006 |

* cited by examiner

GENERATION, DEPLOYMENT AND USE OF TAILORED CHANNEL QUALITY INDICATOR TABLES

CROSS REFERENCE TO RELATED APPLICATIONS

This application claims the benefit of U.S. Provisional Application No. 60/797,292 filed on May 3, 2006, which is incorporated herein by reference in its entirety.

BACKGROUND

The present invention generally relates to wireless communication, and particularly relates to tailoring channel quality information messages.

Advanced wireless communication systems such as third generation (3G) systems and beyond employ various techniques for improving data throughput and signal transmission quality. Many of these techniques are based on estimates of instantaneous channel conditions such as path loss and shadowing, interference variations, and fast multipath fading. Instantaneous channel quality conditions are conventionally measured by devices such as cellular phones and are broadly referred to as Channel Quality Indicators (CQIs). CQI values may correspond to Signal-to-Noise Ratio (SNR), Signal-to-Interference+Noise Ratio (SINR), received signal power or strength level, supportable data rates, supportable modulation and/or coding rates, supportable throughput, etc.

CQI information is conventionally transmitted from a wireless receiver such as a cellular phone to a corresponding transmitter such as a base station, e.g., via physical layer signaling. In one example, CQI information is transmitted in Wideband Code-Division Multiple-Access (WCDMA) based system over a dedicated reverse link in compliance with the High-Speed Downlink Packet Access (HSDPA) protocol. Wireless transmission systems use CQI information to assist in radio resource allocation. For example, CQI information may be used to determine transmission scheduling among multiple receivers, select suitable transmission schemes (e.g., the number of transmit antennas to activate), determine bandwidth allocation, select spreading codes, determine modulation and coding rates, etc.

CQI information is conventionally transmitted in the form of a CQI message. Receivers form CQI messages by first measuring channel quality, e.g., SNR or SINR. The receiver then accesses a standardized CQI table where the table contains ranges of uniquely indexed CQI values. The range in which the measured channel quality falls is identified by selecting the corresponding index value. The selected index value is mapped to a sequence of channel quality information bits, e.g., using a (20,5) block coding technique where 5 bits are encoded into a 20 bit-codeword for error protection. The encoded channel quality information bits are then mapped onto a physical channel and transmitted as a message.

The ranges of CQI values stored in a conventional CQI table are fixed and predetermined well in advance of system deployment. In one example, all transmission systems and cells compatible with the 3G Universal Mobile Telecommunications System (UMTS) technology use a fixed table of CQI values having predetermined spacing regardless of individual cell characteristics. In another example, HSDPA also employs a fixed CQI table where the ranges of CQI values are separated by 1 dB power differences regardless of individual cell characteristics. As such, a universal table of CQI values is conventionally used to form CQI message regardless of anomalies or differences that may arise between cells within a radio access network. In addition, both UMTS and HSDPA employ CQI messages having a fixed length of five bits to represent the available ranges of CQI values regardless of individual cell characteristics.

SUMMARY

According to the methods, apparatus, and computer program products taught herein, Channel Quality Indicator (CQI) tables are tailored to one or more cells of interest. Since channel conditions vary from cell to cell, a more accurate channel quality feedback mechanism results by using CQI tables tailored to the channel conditions of individual cells. The use of tailored CQI tables permits devices such as radio base stations to more reliably and accurately allocate radio resources within particular cells.

According to one embodiment, a table of CQI values is composed by analyzing information indicating channel quality in a cell of interest and generating at least one table of CQI values tailored to the cell of interest based on the information analyzed. In one embodiment, the information corresponds to CQI values previously reported in the cell of interest. In another embodiment, CQI tables are tailored based on other information that indicates channel quality in one or more cells of interest such as cell size, radio frequency reuse patterns, cell terrain features, supported transmit and receive antenna configurations, and signal transmission load conditions.

According to another embodiment, a tailored table of CQI values is deployed by retrieving a CQI table associated with a cell of interest, the CQI table comprising ranges of CQI values determined based on information indicating channel quality in the cell of interest and deploying the CQI table. The table may be deployed to all devices in the cell of interest via a broadcast channel or to a single device via a dedicated control channel. Alternatively, the table may be deployed to a group of devices in the cell of interest by notifying those devices of a forthcoming CQI table transaction and then transmitting the CQI table via a broadcast channel. Only those devices notified of the forthcoming transaction will be prepared to receive the table.

According to yet another embodiment, channel quality is indicated by a wireless communication device by accessing a table of channel quality indicator (CQI) values, the table comprising ranges of CQI values determined based on information indicating channel quality in a cell of interest. The range of CQI values that includes a channel quality estimate derived by the wireless communication device is identified and a channel quality information message is generated based on the identified range of CQI values.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
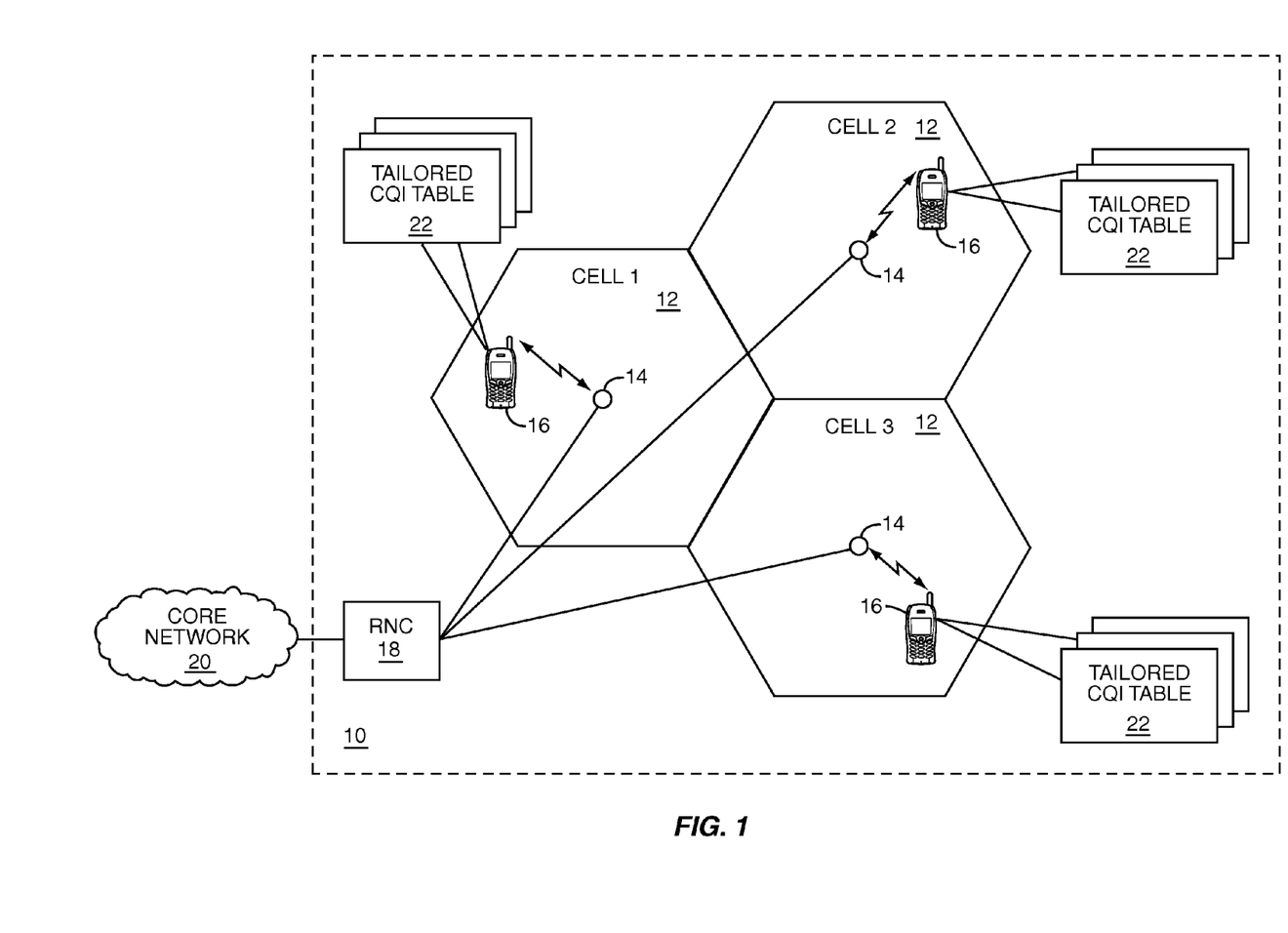
FIG. 1 is a block diagram of one embodiment of a wireless network that employs tailored Channel Quality Indicator (CQI) tables.

FIG. 1 illustrates an embodiment of a wireless communication network 10. The network 10 provides wireless services to various geographic areas, also referred to as cells 12. To that end, radio base stations 14 provide radio resources to and maintain radio links with mobile devices 16 such as cellular phones located within the cells 12 served by the base stations 14. A radio network controller 18 controls the base stations 14, manages radio network resources, and provides interfaces to the base stations 14, other wireless networks (not shown) and a core network 20 such as the public switched telephone network and/or the Internet. Each base station 14 determines how its radio resources are allocated to the mobile devices 16 it services based in-part on channel quality estimates feedback from the mobile devices 16 to the respective base stations 14.

The mobile devices 16 transmit channel quality estimates in the form of a Channel Quality Indicator (CQI) message. A mobile device 16 forms a CQI message by accessing a CQI table 22 associated with a cell 12 of interest and identifying a range of CQI values that includes the channel quality estimate derived by the mobile device 16. The index value associated with the identified range of CQI values is mapped to a corresponding series of bits and transmitted to the corresponding base station 14. The base station 14 receives the message, decodes the message bits, and adjusts allocation of its radio resources based in-part on the received index value.

The CQI tables 22 accessed by the mobile devices 16 are tailored to particular cells 12 of interest, e.g., the cell 12 in which a particular device 16 is currently being serviced. Since channel conditions vary from cell to cell, a more accurate channel quality feedback mechanism results by using CQI tables 22 tailored to the channel conditions of individual cells 12 as compared to using a conventional standardized table. The use of tailored CQI tables 22 permits the base stations 14 to more reliably and accurately allocate radio resources within particular cells 12.

Figure 2:
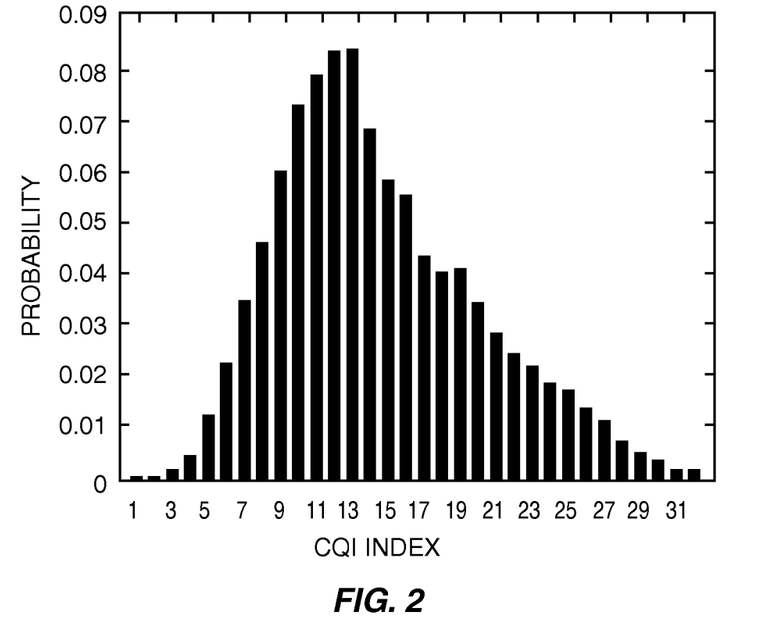
FIG. 2 is a chart diagram of a distribution of conventional CQI index values reported in an exemplary suburban macrocell system.

To demonstrate the benefit of using tailored CQI tables 22, FIG. 2 illustrates an exemplary distribution of conventional High-Speed Downlink Packet Access (HSDPA) based CQI index values reported in a suburban macrocell environment. Each index value represents a range of Signal-to-Interference+Noise Ratios (SINRs). The distribution of reported indexes is not uniform, thus indicating that mobile devices tend to report some CQI index values with a greater frequency than others. Even though some conventional index values tend to be reported more frequently than others, they represent ranges of CQI values having the same resolution (1 dB in SINR) as do the index values reported less frequently. As such, it becomes difficult for a base station to distinguish between mobile devices when they frequently report the same CQI index value. That is, mobile devices serviced in the exemplary suburban macrocell environment tend to report the same limited range of CQI index values with greater frequency, thus making it difficult to distinguish between mobile devices that have better radio reception and those that do not. Reliable and accurate radio resource allocation becomes difficult if the channel quality estimates most likely to be reported by mobile devices are indistinguishable.

Figure 3:
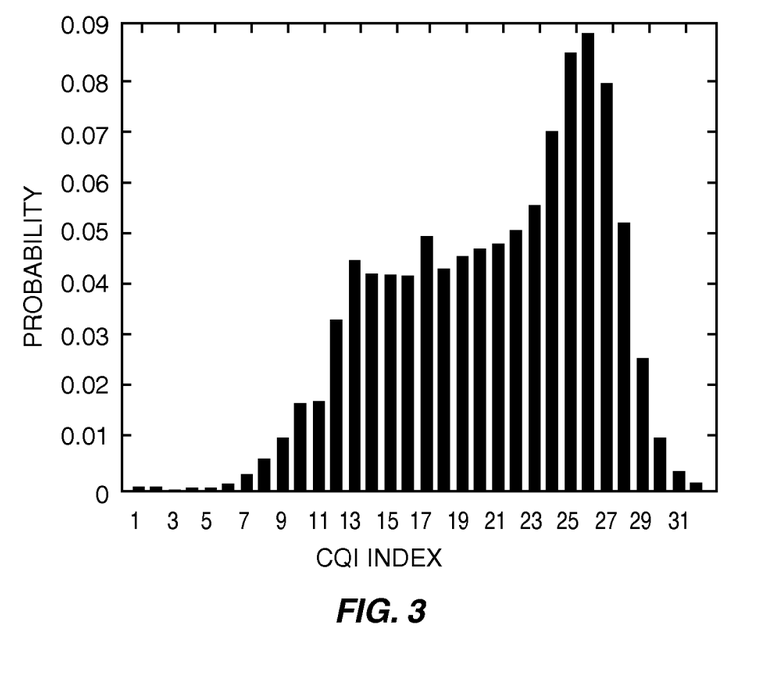
FIG. 3 is a chart diagram of a distribution of conventional CQI index values reported in an exemplary urban microcell system.

FIG. 3 illustrates another exemplary distribution of conventional HSDPA-based CQI index values, where the index values represent channel quality estimates reported in an urban microcell environment. The distribution of reported CQI index values is also non-uniform, yet dissimilar to the one associated with the suburban macrocell environment previously described. The differences between these two distributions demonstrate that channel quality varies from cell to cell. For example, the urban microcell environment in general has better channel quality as indicated by the skewed distribution of higher CQI index values (where higher index values represent better measured channel quality). Radio resource allocation within a cell 12 of interest may be improved by tailoring one or more of the CQI tables 22 to the cell 12 of interest.

Figure 4:
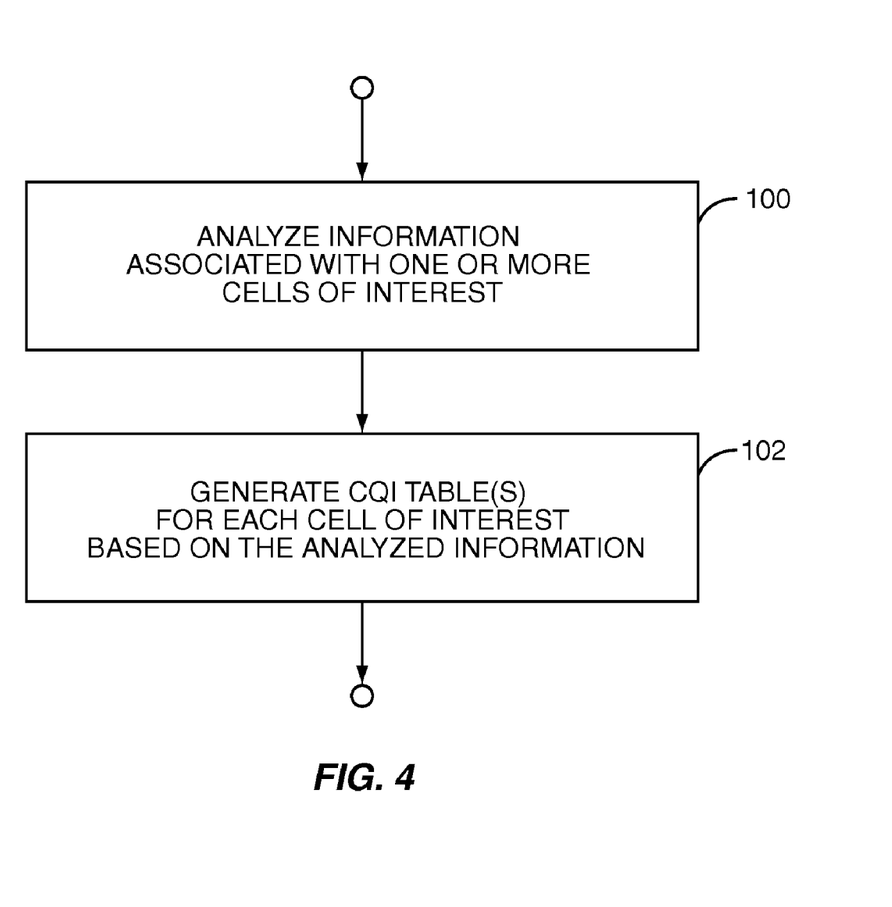
FIG. 4 illustrates one embodiment of processing logic for generating tailored CQI tables.

The CQI tables 22 may be tailored to one or more cells 12 of interest based on information that indicates channel quality in those cells 12. The channel quality information associated with each cell 12 of interest is analyzed, as illustrated by Step 100 of FIG. 4. The analyzed information is then used to generate CQI tables 22 that are tailored to the cells 12 of interest, as illustrated by Step 102 of FIG. 4. The CQI tables 22 may be tailored once, e.g., during design or deployment of the network 10 or periodically to reflect changing channel conditions.

In one embodiment, the information used to tailor the CQI tables 22 corresponds to CQI messages reported by mobile devices 16 in a cell 12 of interest. According to this embodiment, CQI messages reported in the cell 12 of interest are analyzed and ranges of CQI values are selected so that each range of values is reported with approximately equal probability. This way, channel quality estimates expected to be reported most frequently are grouped into ranges having greater precision while those expected to be reported less frequently are grouped into ranges having less precision. Correspondingly, allocation of radio resources becomes more accurate and reliable since the channel quality estimates measured most often by the mobile devices 16 are reported using more precise CQI information.

Figure 5:
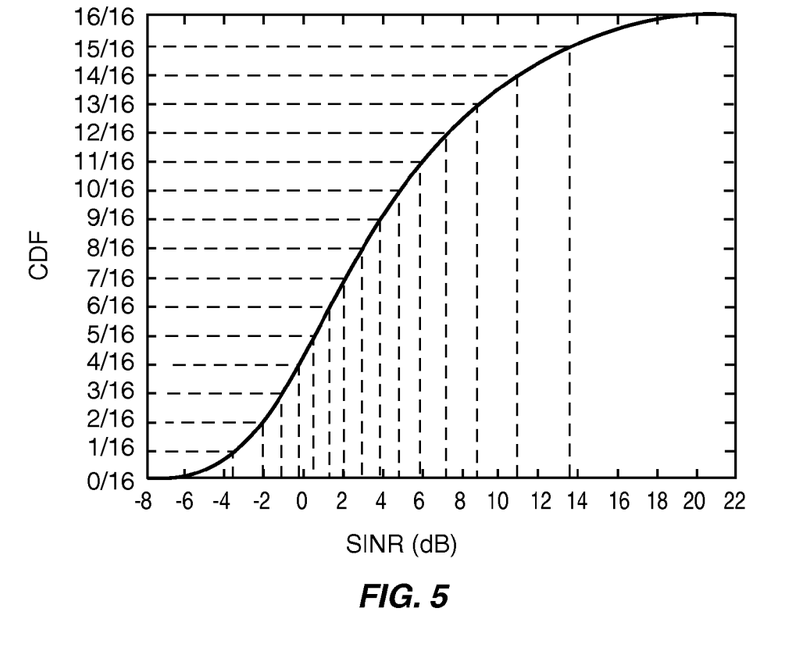
FIG. 5 is a chart diagram of one embodiment of generating a tailored CQI table for the suburban macrocell system of FIG. 2.
Figure 6:
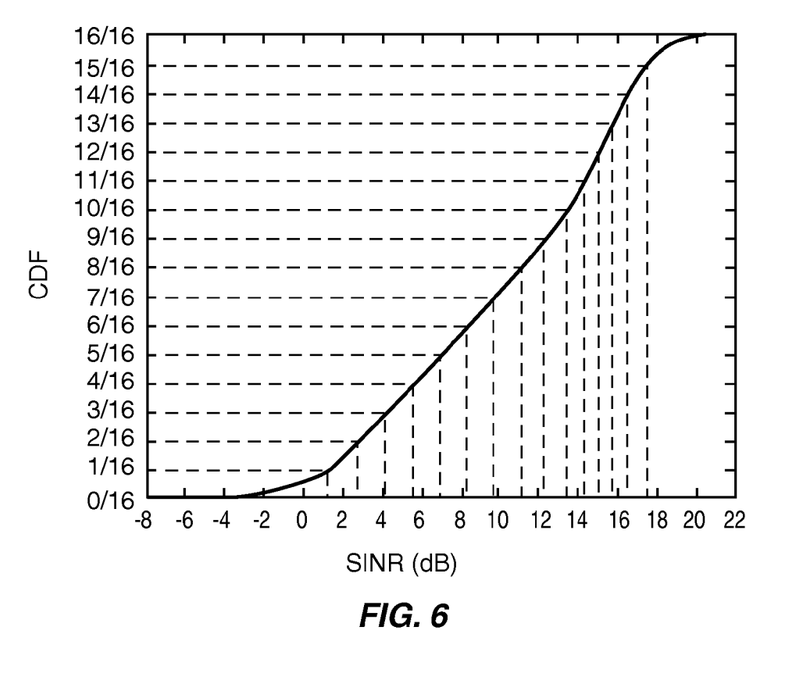
FIG. 6 is a chart diagram of one embodiment of generating a tailored CQI table for the urban microcell system of FIG. 3.

FIG. 5 illustrates one embodiment of selecting ranges of CQI values so that each range of values is reported with approximately equal probability. FIG. 5 depicts a Cumulative Probability Distribution Function (CDF) of the SINRs corresponding to the channel quality information for the suburban macrocell environment previously discussed. The CDF is divided into equal segments, where each segment represents a range of SINRs expected to be reported with approximately equal probability. For example, in FIG. 5, the CDF is divided into sixteen equal segments. However, the CDF may be divided into any desired number of segments. Each equiprobable range of CQI values is assigned a unique index value, the index values forming the basis for a CQI message. Similarly, FIG. 6 illustrates a CDF of the SINRs corresponding to the channel quality information for an urban microcell environment.

As can be seen in Table 1 below, the tailored ranges of CQI values for both the microcell and macrocell environments have varying precision. However, unlike conventional CQI tables, the ranges of CQI values each have an approximately equal probability of occurrence. As such, each CQI index value can be expected to be reported with the same probability of occurrence when the corresponding tables 22 are deployed in cell 12. In addition, the ranges of CQI values are selected based on information indicating channel quality in each of the respective cell environments, mainly previously reported CQI messages. Furthermore, only four bits are needed to map the index values to CQI message bits since the CDFs are divided into sixteen equal segments. This represents a 20% reduction in the number of bits needed to convert a conventional CQI index value to a CQI message, thus reducing the likelihood of CQI message transmission errors. Note, although one less bit is used as compared to conventional CQI techniques, the tailored tables 22 yield more precise ranges of CQI values for channel quality estimates expected to be reported most often.

TABLE 1

Exemplary Tailored CQI Tables

| CQI Index | SINR Range in dB (Macrocell Table) | SINR Range in dB (Microcell Table) |
| --- | --- | --- |
| 1 | $(-\infty, -3.4]$ | $(-\infty, 1.5]$ |
| 2 | $(-3.4, -2.0]$ | $(1.5, 2.8]$ |
| 3 | $(-2.0, -0.9]$ | $(2.8, 4.3]$ |
| 4 | $(-0.9, -0.1]$ | $(4.3, 5.9]$ |
| 5 | $(-0.1, 0.7]$ | $(5.9, 7.2]$ |
| 6 | $(0.7, 1.5]$ | $(7.2, 8.6]$ |
| 7 | $(1.5, 2.2]$ | $(8.6, 10.0]$ |
| 8 | $(2.2, 3.0]$ | $(10.0, 11.3]$ |
| 9 | $(3.0, 3.9]$ | $(11.3, 12.5]$ |
| 10 | $(3.9, 5.0]$ | $(12.5, 13.5]$ |
| 11 | $(5.0, 6.1]$ | $(13.5, 14.3]$ |
| 12 | $(6.1, 7.5]$ | $(14.3, 15.1]$ |
| 13 | $(7.5, 9.1]$ | $(15.1, 15.8]$ |
| 14 | $(9.1, 11.2]$ | $(15.8, 16.5]$ |
| 15 | $(11.2, 14.1]$ | $(16.5, 17.5]$ |
| 16 | $(14.1, +\infty]$ | $(17.5, +\infty]$ |

In another embodiment, the CQI tables 22 are tailored by selecting ranges of CQI values so that they are reported with approximately equal cost instead of equal probability. That is, the CQI tailoring process takes into account the cost associated with inaccurately representing CQI values such as data rate reduction and/or added delay due to retransmissions caused by inaccurate CQI messages. As such, the CQI tables 22 may be tailored by properly weighting and adjusting ranges of CQI values so that each range is reported with approximately equal cost.

In yet another embodiment, the CQI tables 22 are tailored based on other information that indicates channel quality in a cell 12 of interest. For example, the following information may be used to tailor the CQI tables 22: cell size, radio frequency reuse patterns supported by the network 10, cell terrain features, transmit and receive antenna configurations supported within the cells 12, estimated or actual signal transmission load conditions, or any other information that may directly or indirectly indicate channel quality within the cells 12. Regardless as to the type information analyzed, a more accurate channel quality feedback mechanism results by tailoring the CQI tables 22 based on channel quality information associated with one or more cells 12 of interest.

Heretofore, the generation, transmission and use of the tailored CQI tables 22 has been explained in the context of the base stations 14 acting as wireless transmitters and the mobile devices 16 acting as receiving devices. However, the tailored CQI tables 22 may be generated and/or maintained by any device transmitting signals in the wireless network 10 and used by any receiving devices for indicting channel quality.

Figure 7:
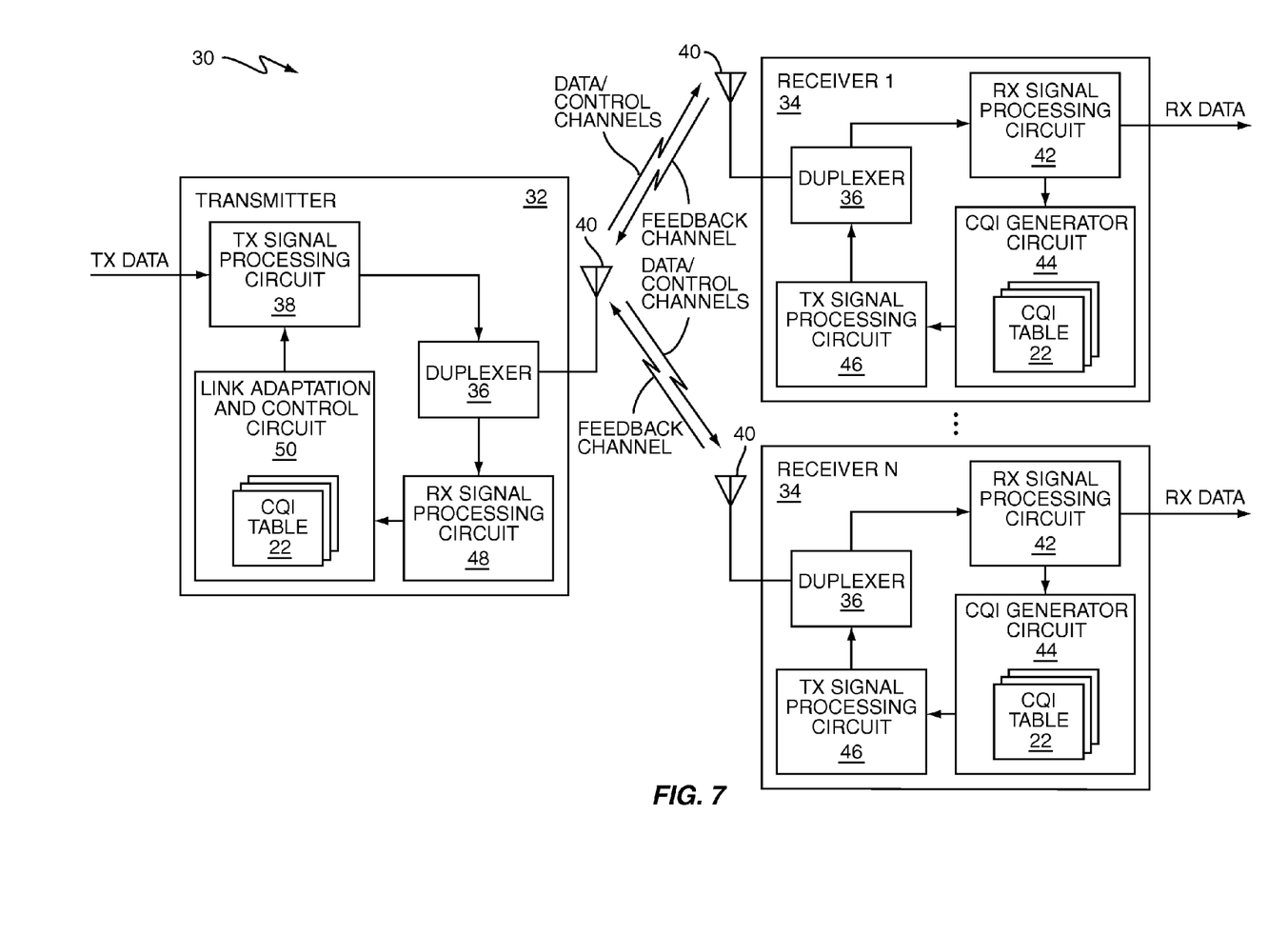
FIG. 7 is a block diagram of one embodiment of a wireless transmitter-receiver arrangement that deploys and uses tailored CQI tables.

To that end, FIG. 7 illustrates one embodiment of a wireless transmitter-receiver arrangement 30 where a wireless transmitter 32 communicates data to one or more wireless receivers 34 over respective wireless communication channels. In turn, the receivers 34 provide a measure of their channel's quality back to the wireless transmitter 32 for use in allocating radio resources. To facilitate dual-path communication, the transmitter 32 and receivers 34 each have a duplexer 36 or other similar circuitry such as a time division switch (not shown) for managing receipt and transmission of signals.

In one embodiment, the wireless transmitter 32 corresponds to the base stations 14 illustrated in FIG. 1 and the wireless receivers 34 correspond to the mobile device 16 serviced by the base stations 14. According to this embodiment, the base stations 14 provide data services to the mobile devices 16 via respective downlink communication channels, e.g., in accordance with the W-CDMA HSDPA protocol. The mobile devices 16 indicate channel quality by sending tailored CQI messages to their serving base stations 14 via respective feedback or reverse channels, e.g., using the High-Speed Dedicated Physical Control Channel (HS-DPCCH) supported by HSDPA.

In another embodiment, the wireless transmitter 32 corresponds to the mobile devices 16 shown in FIG. 1 and the wireless receivers 34 correspond to the base stations 14 that serve the mobile devices 16. According to this embodiment, the mobile devices 16 send data to their base stations 14 via respective uplink communication channels, e.g., in accordance with the W-CDMA High-Speed Uplink Packet Access (HSUPA) protocol. The base stations 14 send tailored CQI messages to their mobile devices 16 via respective feedback channels. As such, the term wireless transmitter as used herein corresponds to any wireless communication device capable of transmitting data to a wireless receiver, and thus in some configurations may include base stations, mobile devices such as cellular phones or portable computers, or the like. Likewise, the term wireless receiver as used herein refers to a wireless device that receives data from a wireless transmitter, and thus in some configurations may also include base stations, mobile devices such as cellular phones or portable computers, or the like.

Figure 8:
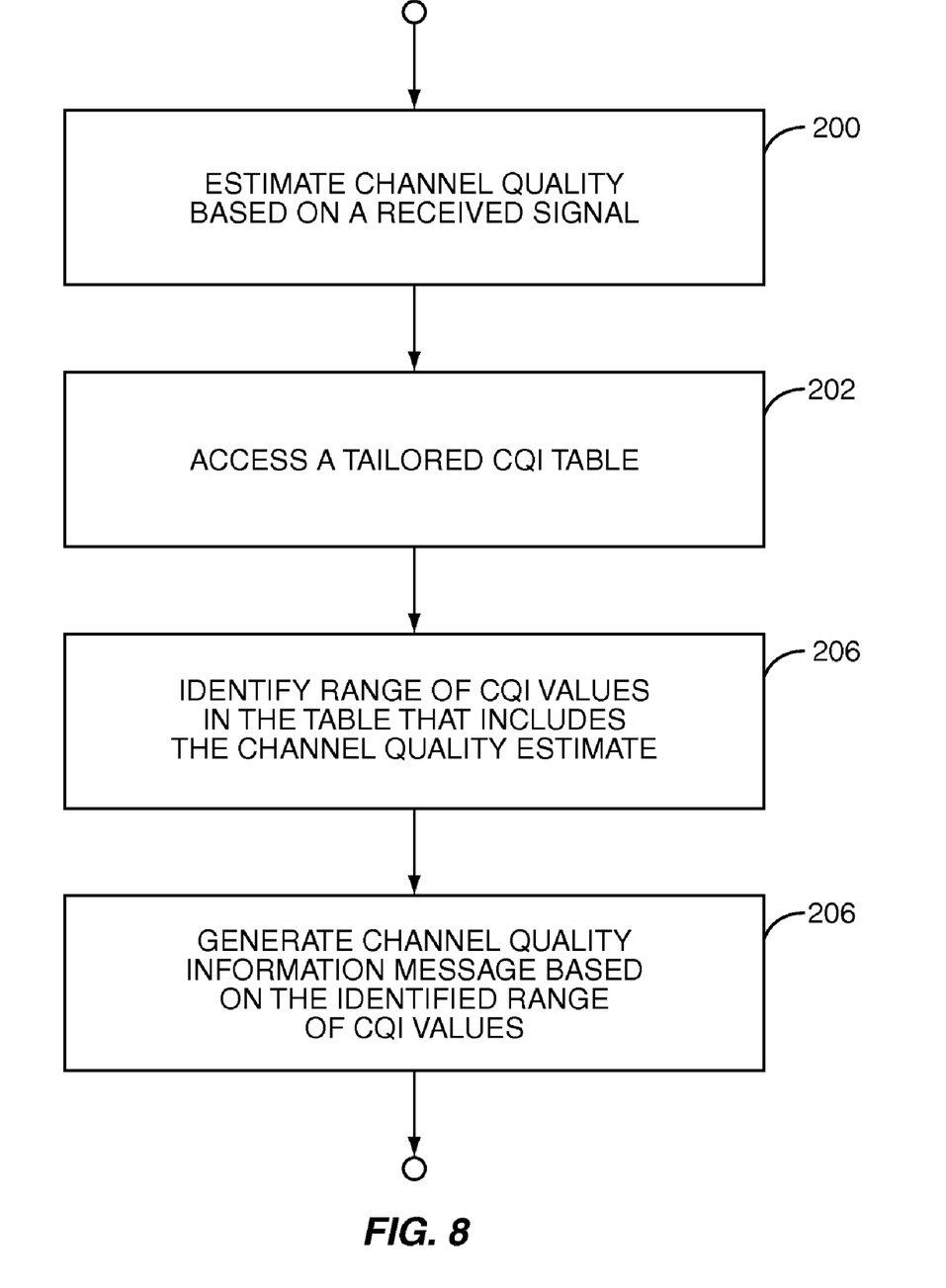
FIG. 8 illustrates one embodiment of processing logic for generating a CQI message using a tailored CQI table.

With this in mind, the wireless transmitter 32 includes transmit signal processing circuitry 38 for preparing data (TX Data) for transmission to one or more of the receivers 34, e.g., by encoding the data and modulating it. Via one or more antennas 40, the transmitter 32 sends the encoded and up-converted data to one or more of the wireless receivers 34 using respective data and control channels. Receive signal processing circuitry 42 included in the receivers 34 estimates the quality of the channel over which the data is received, e.g., by calculating a Signal-to-Noise Ratio (SNR), SINR, or other suitable metric, as illustrated by Step 200 of FIG. 8. A CQI generation circuit 44 included in each receiver 34 accesses a CQI table 22 tailored to the cell 12 currently covering the receiver 34, as illustrated by Step 202 of FIG. 8. The CQI generation circuit 44 searches the tailored CQI table 22 for a range of CQI values that includes the channel quality estimate generated by the receive signal processing circuitry 42, as illustrated by Step 204 of FIG. 8.

The CQI generation circuit 44 identifies the index value associated with the range of CQI values that includes the channel quality estimate. The CQI generation circuit 44 uses the identified index value to form a CQI message for transmission back to the transmitter 32, e.g., by mapping the index value to CQI information message bits, as illustrated by Step 206 of FIG. 8. Transmit signal processing circuitry 46 included in the wireless receiver 34 prepares the CQI message for transmission over a reverse link or feedback channel, e.g., by encoding the message and modulating it.

The decision as to which tailored CQI table 22 the wireless receivers 34 access when forming a CQI message may be determined by the wireless transmitter 32, e.g., by providing a cell identifier to the receivers 34 during call setup or during data packet transfer. When one of the receivers 34 subsequently generates a CQI message, it uses the CQI table associated with the cell identifier. Alternatively, the receivers 34 identify which cell 12 they are located in and generate CQI messages using the table 22 tailored to those cells 12.

When the wireless transmitter 32 receives a new CQI message from one of the wireless receivers 34, it adjusts the radio resources allocated to that receiver 34. That is, if the CQI message indicates good channel quality, the transmitter 32 increases the allocation of radio resources to the receiver 34, e.g., by increasing data transmission rate. To the contrary, if the CQI message indicates poor channel quality, radio resources are de-allocated.

To that end, the wireless transmitter 32 includes receive signal processing circuitry 48 for processing received signals such as CQI messages, e.g., by despreading and demodulating them. Link adaptation and control circuitry 50 included in the transmitter 32 adjusts the transmitter's allocation of radio resources based in-part on received CQI messages. Particularly, the link adaptation and control circuitry 50 recovers the CQI index from a received channel quality message. The circuitry 50 uses the recovered index to perform a lookup into a corresponding tailored CQI table 22, e.g., the table 22 associated with the cell 12 from which the CQI message was received. The entry in the table 22 having the matching index value is retrieved and radio resources are adjusted accordingly. That is, radio resources may be increased, decreased or left alone depending on the range of CQI values retrieved from the table 22. As such, the transmitter 32 uses tailored CQI tables 22 to facilitate more reliable and efficient communications in wireless networks.

Figure 9:
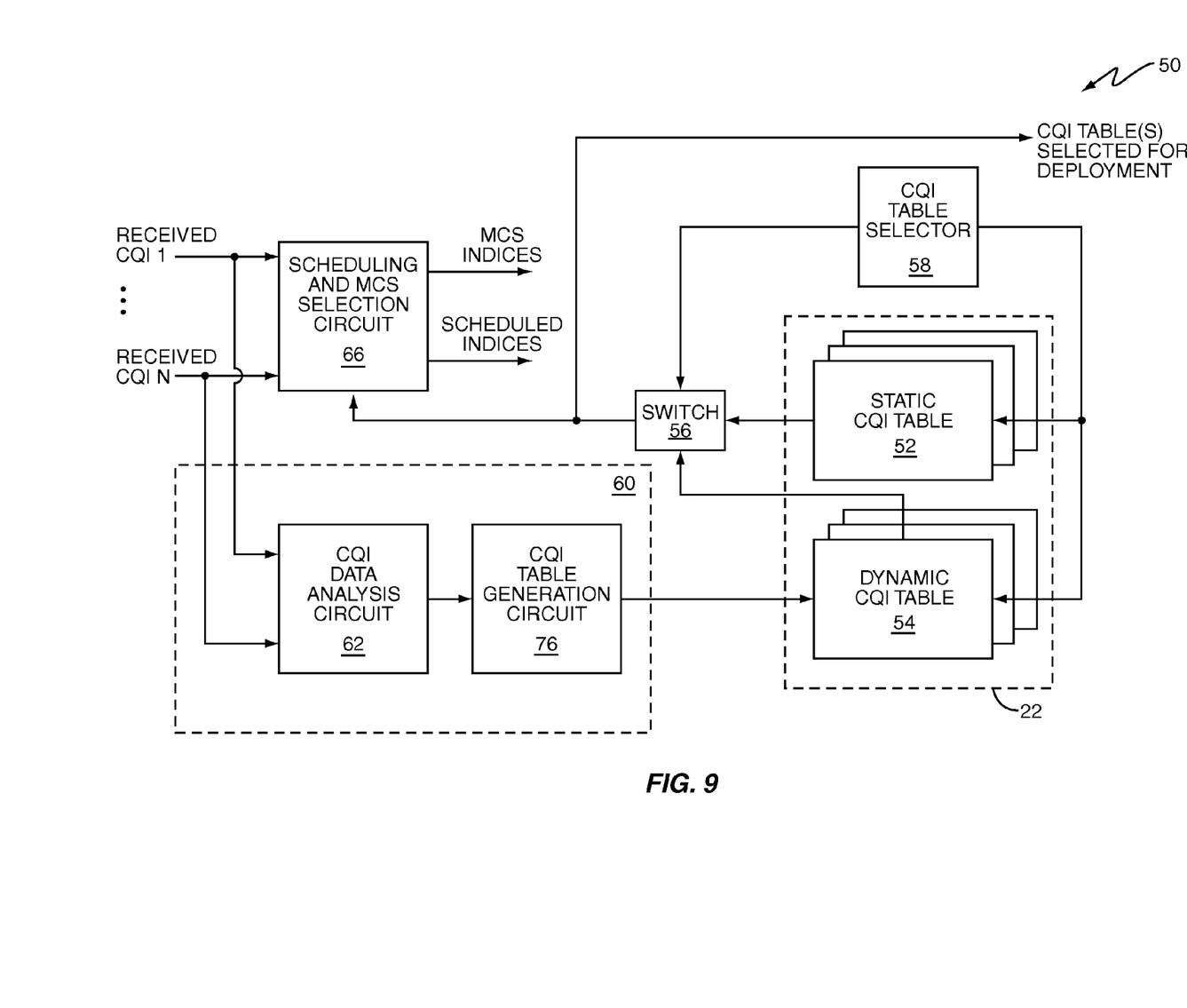
FIG. 9 is a block diagram of one embodiment of circuitry that generates, maintains and deploys tailored CQI tables.
Figure 10:
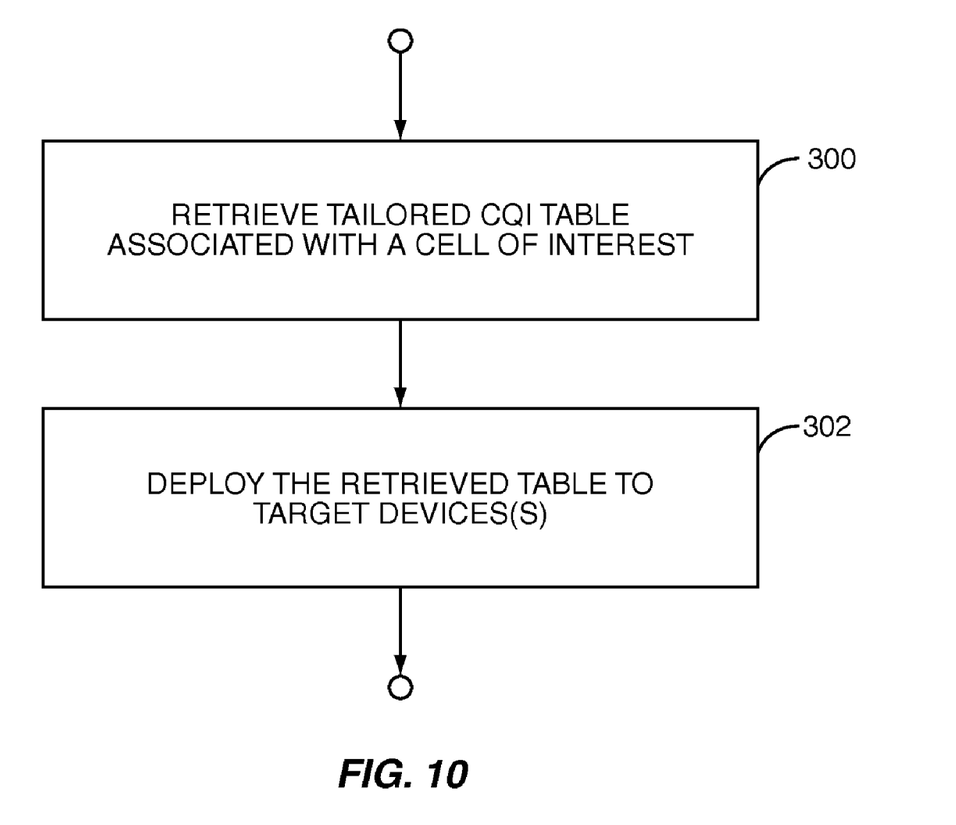
FIG. 10 illustrates one embodiment of processing logic for deploying tailored CQI tables.

FIG. 9 illustrates an embodiment of the link adaptation and control circuitry 50 included in the wireless transmitter 34. According to this embodiment, the tailored CQI tables 22 available for deployment to the wireless receivers 34 may be static 52 (non-updateable), dynamic 54 (updateable) or a combination of both. Circuitry 56 such as a switch or multiplexer selects between static and dynamic CQI tables 52 and 54 if the transmitter 32 supports both types. A table selector 58 controls the switch 56 and identifies a desired table associated with a cell 12 of interest. The desired table 22 is retrieved from memory (not shown), as illustrated by Step 300 of FIG. 10. The retrieved table 22 is then deployed to the target recipient(s), e.g., one or more wireless receivers 34 currently located in the cell 12 of interest, as illustrated by Step 302 of FIG. 10. The table may be deployed via either a downlink channel, e.g., using the HSDPA protocol, or via an uplink channel, e.g., using the HSUPA protocol.

In one embodiment, the retrieved table 22 is deployed to all wireless receivers 34 within the cell 12 of interest, e.g., by transmitting the table 22 over a broadcast channel. Alternatively, the retrieved table is deployed to an individual wireless receiver 34 using a dedicated control channel. In yet another embodiment, the retrieved table is deployed to groups of wireless receivers 34, e.g., by sending a notification message to select receivers 34 via their respective dedicated control channels, the message instructing them to monitor a broadcast channel for new CQI tables. Only those receivers 34 notified on their respective dedicated control channels know to monitor the broadcast channel for CQI table updates.

The CQI table 22 deployed to the target wireless receivers 34 may be static (52) or dynamic (54) as previously described. Static CQI tables 52 may be pre-computed and downloaded to the transmitter 32 during initiation or setup of the transmitter 32, e.g., from the radio network controller 18 of FIG. 1 to one of the base stations 14 if the transmitter 32 is a base station 14. Alternatively, the static CQI tables 52 may be pre-computed and downloaded to the transmitter 32 during call setup or data packet transfer, e.g., from one of the base stations 14 of FIG. 1 to one of the mobile devices 16 if the transmitter 32 is a mobile device 16.

The dynamic tables 54 may be periodically regenerated at fixed intervals (e.g., based on the time of day) or in response to a triggering event (e.g., the number of mobile devices 16 being served by a base station 14 exceeding a certain limit). In one embodiment, the dynamic CQI tables 54 are generated and updated based on newly received data such as CQI messages received from devices 34 in contact with the transmitter 32. To that end, the transmitter 32 has circuitry 60 for generating the dynamic CQI tables 54 based on received CQI messages. The circuitry 60 includes a CQI analysis circuit 62 for analyzing received CQI information. In one embodiment, the CQI analysis circuit 62 generates distributions of received CQI index values so that it may select ranges of CQI values having approximately equal probabilities of occurrence, as previously described and in accordance with FIGS. 5 and 6 and Table 1. Alternatively, the CQI analysis circuit 62 selects ranges of CQI values having an approximately equal probability of cost, also as previously described.

Regardless as to the type of channel quality information analyzed, preexisting tables are regenerated with freshly analyzed data. For example, in a first iteration, a conventional table of standardized CQI index values is replaced with one or more newly generated CQI tables 22 each tailored to a cell 12 of interest. During subsequent iterations, the newly generated CQI tables 22 are regenerated with freshly analyzed data.

In general, the CQI tables 22 may be updated by adjusting the threshold values of each range of CQI values. Preexisting CQI threshold values, denoted by $\{t_i\}_{i=1}^{N-1}$, represent the beginning and end values of a range of CQI values associated with a particular index value, where N denotes the number of ranges of CQI values. For example, in Table 1, $t_1=-3.4$, $t_2=-2.0$, $t_3=-0.9$, etc. for the macrocell case. During a first iteration, $t_0 \equiv t_1 - \delta(t_2-t_1)$ and $t_N \equiv t_{N-1}+\delta(t_{N-1}-t_{N-2})$ for some predefined parameters $\delta \geqq 1$. The index k(i) is solved so that:

$$F_i = \sum_{j=1}^{k(i)-1} p_j < \frac{i}{N} \leq \sum_{j=1}^{k(i)} p_j \quad (1)$$

for each i=1,2, ..., N, where $p_i \in [0,1]$ denotes how often the $i^{th}$ CQI index value is reported for the preexisting CQI table 22. The CQI threshold values are then updated as given by:

$$t'_i = t_{k(i)-1} + (t_{k(i)} - t_{k(i)-1}) \left[ \frac{i - N F_i}{N p_{k(i)}} \right] \quad (2)$$

Regardless as to how CQI threshold values are updated, a CQI table generation circuit 64 generates the dynamic CQI tables

54 by assigning unique index values to the newly updated ranges of CQI values determined by the CQI analysis circuit 62.

In addition to maintaining the tailored CQI tables 22 and deploying them to the appropriate wireless receivers 34, the wireless transmitter 32 also uses the tables 22 to make radio resource allocation decisions, e.g., fast link adaptation, fast scheduling, and fast cell selection. In more detail, received CQI messages are processed by circuitry 66 included in the transmitter 32 that controls among other things link adaptation, scheduling and cell selection. When the transmitter 32 receives a new CQI message, it is decoded and the corresponding CQI index value is recovered. The transmitter 32 uses the recovered index value to perform a lookup in the corresponding (dynamic or static) CQI table 22, which is selected by the table selector 58. The range of CQI values identified during the table lookup process is used to allocate radio resources. For example, the link adaptation and control circuitry 50 determines which wireless receiver(s) 34 are allocated cell resources at a given time (Scheduled Indices) and which cells 12 are "best" for data packet transmission (MCS Indices) based in-part on received CQI messages.

Figure 11:
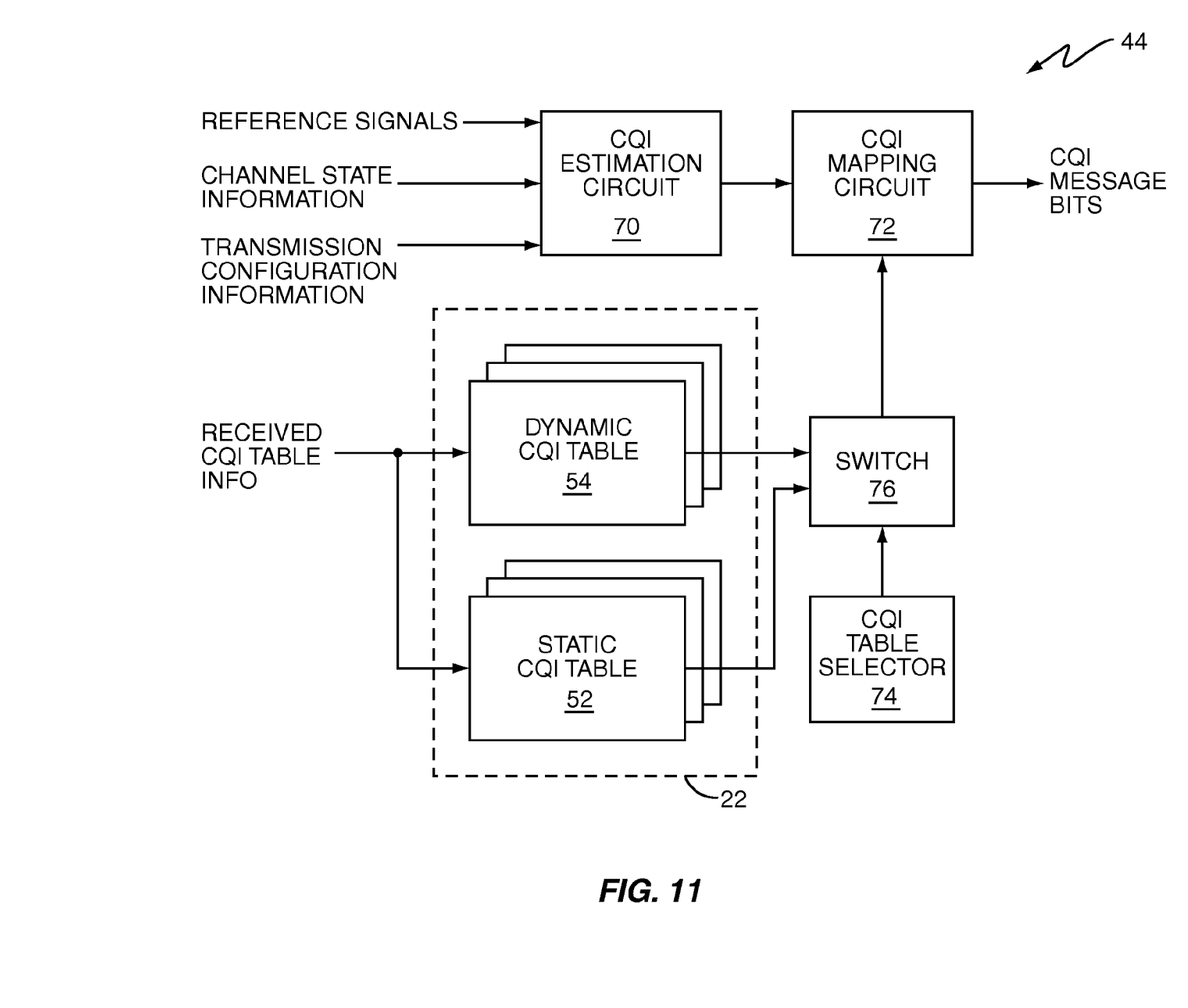
FIG. 11 is a block diagram of one embodiment of circuitry that uses tailored CQI tables to generate CQI messages.

Turning now to the wireless receivers 34, FIG. 11 illustrates one embodiment of the CQI generation circuit 44 included therein. The CQI generation circuit 44 comprises a CQI estimation circuit 70 for generating channel quality estimates such as SINR, SNR, or other suitable metrics. The CQI estimation circuit 70 generates channel quality estimates based on one or more received reference signals such as pilot signals, channel state information such as channel coefficients and received signal processing delay values, and transmission configuration information such as the number and weighting of active antennas. The channel quality estimate is then packaged in the form of a CQI message and sent to the transmitter 32.

To that end, a CQI mapping circuit 72 maps the channel quality estimate to a series of CQI message bits for transmission to the transmitter 32. The CQI mapping circuit 72 performs channel quality estimate mapping by accessing a tailored CQI table 22 and identifying the range of CQI values that includes the channel quality estimate. The mapping circuit 72 then maps the index value associated with the identified range of CQI values to CQI message bits. The CQI message bits are sent to the wireless transmitter 32 for indicating channel quality. In turn, the transmitter 32 uses the CQI information to allocate radio resources as previously described.

The table accessed by the CQI mapping circuit 72 is selected by table selection circuitry 74, e.g., the table 22 selected may be associated with a cell 12 of interest. After a desired table 22 has been identified, the table selection circuitry 74 causes circuitry 76 such as a switch or multiplexer to provide the desired table 22 to the CQI mapping circuit 22. As such, the switch 76 allows the table selection circuitry 74 to select either a static or dynamic CQI table 52 or 54 if both are available. Both the static and dynamic tables 52 and 54 may be downloaded from the transmitter 32, or alternatively, programmed into the wireless receiver 34 during the manufacturing process. For example, CQI table information may be received from the transmitter 32 via a dedicated control channel, a broadcast channel, or from both (where the transmitter 32 notifies the receiver 34 of an impending CQI table transfer via a dedicated control channel such as the DCCH channel and the receiver 32 monitors a broadcast channel such as the BCH channel for a subsequent transmission).

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of indicating channel quality by a wireless communication device, comprising:
    configuring a channel quality indicator (CQI) reporting table to have higher resolution in a range of channel quality measurements that are characteristic for a cell in which the wireless communication device is presently operating and lower resolution elsewhere;
    updating the CQI reporting table responsive to the wireless communication device moving into a new cell so that the CQI reporting table has higher resolution in a range of channel quality measurements that are characteristic for the new cell and lower resolution elsewhere; and
    reporting CQI information by the wireless communication device with varying resolution according to the CQI reporting table.

2. The method of claim 1, comprising configuring and/or updating the CQI reporting table based on previously reported CQI values.

3. The method of claim 1, comprising configuring and/or updating the CQI reporting table based on at least one of cell size, radio frequency reuse patterns, cell terrain features, supported transmit and receive antenna configurations, and signal transmission load conditions.

4. The method of claim 1, wherein ranges of CQI values included in the CQI reporting table have approximately equal probabilities of occurrence.

5. The method of claim 1, wherein ranges of CQI values included in the CQI reporting table have approximately equal costs.

6. The method of claim 1, comprising receiving the CQI reporting table from a dedicated control channel.

7. The method of claim 1, comprising receiving the CQI reporting table from a broadcast channel.

8. The method of claim 7, wherein receiving the CQI reporting table from a broadcast channel comprises:
    receiving notification, from a dedicated control channel, of a forthcoming CQI table transaction; and
    in response to the notification, receiving the CQI reporting table from the broadcast channel.

9. A wireless communication device, comprising:
    a channel quality indicator (CQI) reporting table; and
    signal processing circuitry operable to configure the CQI reporting table to have higher resolution in a range of channel quality measurements that are characteristic for a cell in which the wireless communication device is presently operating and lower resolution elsewhere, update the CQI reporting table responsive to the wireless communication device moving into a new cell so that the CQI reporting table has higher resolution in a range of channel quality measurements that are characteristic for the new cell and lower resolution elsewhere, and report CQI information with varying resolution according to the CQI reporting table.

10. The wireless communication device of claim 9, wherein the signal processing circuitry is operable to configure and/or update the CQI reporting table based on previously reported CQI values.

11. The wireless communication device of claim 9, wherein the signal processing circuitry is operable to configure and/or update the CQI reporting table based on at least one of cell size, radio frequency reuse patterns, cell terrain features, supported transmit and receive antenna configurations, and signal transmission load conditions.

12. The wireless communication device of claim 9, wherein ranges of CQI values included in the CQI reporting table have approximately equal probabilities of occurrence.

13. The wireless communication device of claim 9, wherein ranges of CQI values included in the CQI reporting table have approximately equal costs.

14. The wireless communication device of claim 9, wherein the signal processing circuitry is operable to receive the CQI reporting table from a dedicated control channel.

15. The wireless communication device of claim 9, wherein the signal processing circuitry is operable to receive the CQI reporting table from a broadcast channel.

16. The wireless communication device of claim 15, wherein the signal processing circuitry is operable to receive notification from a dedicated control channel of a forthcoming CQI table transaction, and in response to the notification receive the CQI reporting table from the broadcast channel.

17. A method of composing tailored channel quality indicator (CQI) reporting tables, comprising:
analyzing channel quality measurements for a plurality of cells; and
generating a channel quality indicator (CQI) reporting table tailored at a signal transmission device for each cell with higher resolution in a range of the channel quality measurements that are characteristic for the particular cell and lower resolution elsewhere so that the CQI reporting tables have the same indexes associated with different ranges of CQI values.

18. The method of claim 17, comprising receiving the channel quality measurements from wireless communication devices.

19. The method of claim 17, wherein the channel quality measurements correspond to at least one of cell size, radio frequency reuse patterns, cell terrain features, supported transmit and receive antenna configurations, and signal transmission load conditions.

20. The method of claim 17, comprising determining ranges of CQI values included in a particular one of the CQI reporting tables such that the ranges have approximately equal probabilities of occurrence.

21. The method of claim 17, comprising determining ranges of CQI values included in a particular one of the CQI reporting tables such that the ranges have approximately equal costs.

22. The method of claim 17, comprising generating at least one of the CQI reporting tables by recomposing a preexisting table of CQI values.

23. The method of claim 22, wherein in a first iteration, recomposing a preexisting table of CQI values comprises recomposing a standard table of CQI values.

24. The method of claim 17, comprising updating the CQI reporting table for a first one of the cells based on newly received channel quality measurements for the first cell.

25. A computer program product stored on a non-transitory computer readable medium for composing tailored channel quality indicator (CQI) reporting tables, the computer program product comprising:
program code for analyzing channel quality measurements for a plurality of cells; and
program code for generating a channel quality indicator (CQI) reporting table tailored for each cell with higher resolution in a range of the channel quality measurements that are characteristic for the particular cell and lower resolution elsewhere so that the CQI reporting tables have the same indexes associated with different ranges of CQI values.

26. The computer program product of claim 25, comprising program code for determining ranges of CQI values included in a particular one of the CQI reporting tables such that the ranges have approximately equal probabilities of occurrence.

27. The computer program product of claim 25, comprising program code for determining ranges of CQI values included in a particular one of the CQI reporting tables such that the ranges have approximately equal costs.

28. The computer program product of claim 25, comprising program code for generating at least one of the CQI reporting tables by recomposing a preexisting table of CQI values.

29. The computer program product of claim 25, comprising program code for recomposing a standard table of CQI values in a first iteration.

30. The computer program product of claim 25, comprising program code for updating the CQI reporting table for a first one of the cells based on newly received channel quality measurements for the first cell.

31. A method of deploying tailored channel quality indicator (CQI) reporting tables, comprising:
deploying a first CQI reporting table to a wireless communication device presently operating in a first cell, the first CQI reporting table having higher resolution in a range of channel quality measurements that are characteristic for the first cell and lower resolution elsewhere; and
deploying a second CQI reporting table to the wireless communication device responsive to the wireless communication device moving into a second cell different than the first cell, the second CQI reporting table having higher resolution in a range of channel quality measurements that are characteristic for the second cell and lower resolution elsewhere.

32. The method of claim 31, comprising deploying at least one of the first and second CQI reporting tables via at least one dedicated control channel.

33. The method of claim 31, comprising deploying at least one of the first and second CQI reporting tables via a broadcast channel.

34. The method of claim 33, wherein deploying at least one of the first and second CQI reporting tables via a broadcast channel comprises:
transmitting, via at least one dedicated control channel, a notification indicating a forthcoming CQI table transaction; and
subsequently transmitting at least one of the first and second CQI reporting tables via the broadcast channel.

35. The method of claim 31, comprising determining ranges of CQI values for the first CQI reporting table and/or the second CQI reporting table such that the ranges have approximately equal probabilities of occurrence.

36. The method of claim 31, comprising determining ranges of CQI values for the first CQI reporting table and/or the second CQI reporting table such that the ranges have approximately equal costs.

37. A communication device, comprising:
selection circuitry configured to select a first CQI reporting table for a wireless communication device presently operating in a first cell, the first CQI reporting table having higher resolution in a range of channel quality measurements that are characteristic for the first cell and lower resolution elsewhere, and select a second CQI reporting table for the wireless communication device responsive to the wireless communication device moving into a second cell different than the first cell, the second CQI reporting table having higher resolution in a range of channel quality measurements that are characteristic for the second cell and lower resolution elsewhere; and transmit circuitry configured to deploy the selected CQI reporting table to the wireless communication device.

38. The communication device of claim 37, wherein the transmit circuitry is configured to deploy at least one of the first and second CQI reporting tables via at least one dedicated control channel.

39. The communication device of claim 37, wherein the transmit circuitry is configured to deploy at least one of the first and second CQI reporting tables via a broadcast channel.

40. The communication device of claim 39, wherein the transmit circuitry is configured to transmit, via at least one dedicated control channel, a notification indicating a forthcoming CQI table transaction, and subsequently transmit at least one of the first and second CQI reporting tables via the broadcast channel.

41. The communication device of claim 37, wherein the selection circuitry is configured to determine ranges of CQI values for the first CQI reporting table and/or the second CQI reporting table such that the ranges have approximately equal probabilities of occurrence.

42. The communication device of claim 37, wherein the transmit circuitry is configured to determine ranges of CQI values for the first CQI reporting table and/or the second CQI reporting table such that the ranges have approximately equal costs.

* * * * *